Nov. 25, 1958    E. C. CURTIS ET AL    2,861,657
AUTOMATIC SLACK ADJUSTER FOR BRAKE
Filed Sept. 23, 1953
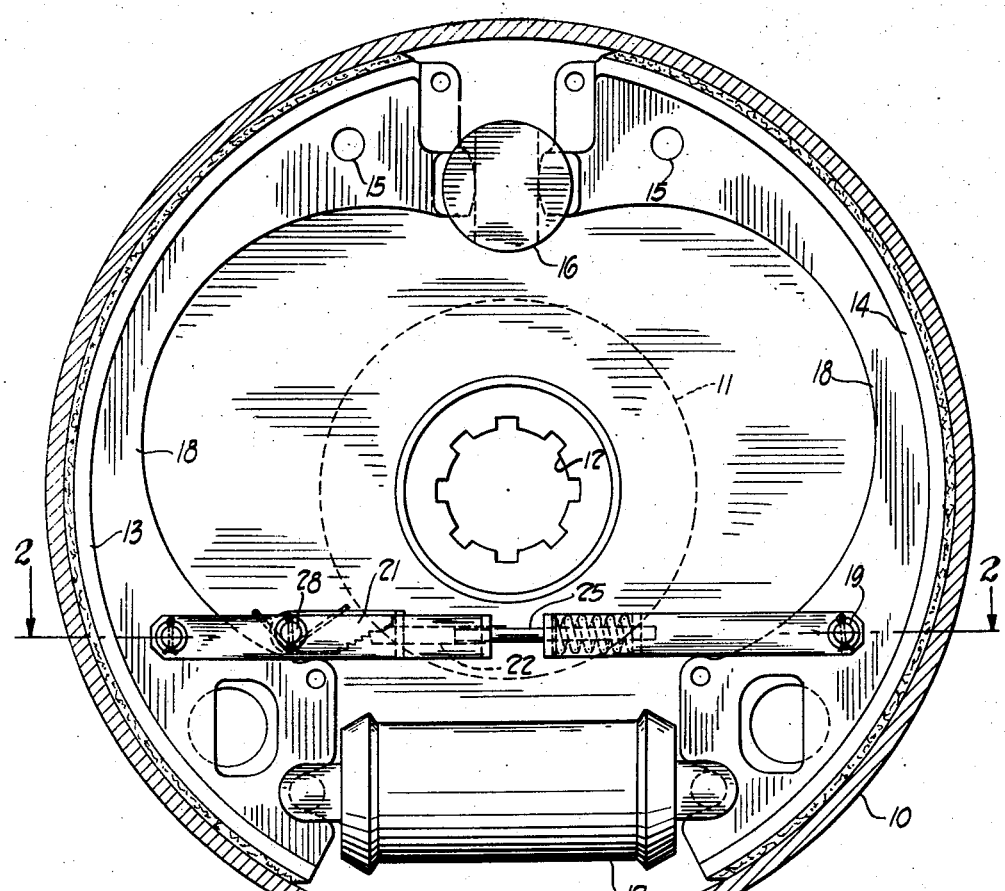
Fig. 1
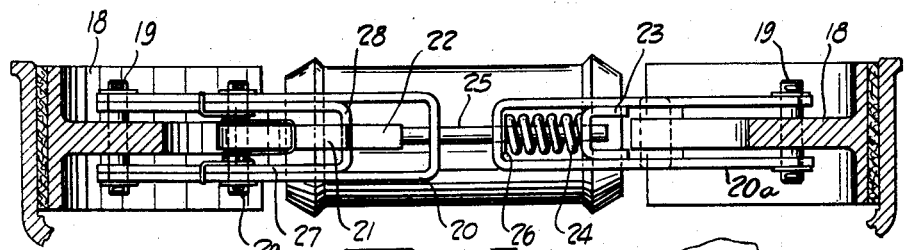
Fig. 2
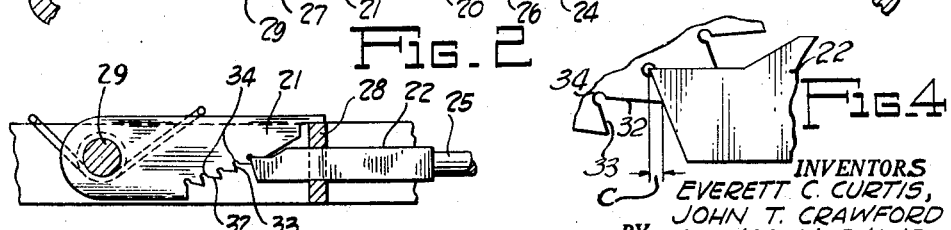
Fig. 3
Fig. 4
INVENTORS
EVERETT C. CURTIS,
JOHN T. CRAWFORD
BY & DAFYDD W. EVANS
RICHEY, WATTS, EDGERTON & McNENNY
A H Edgerton
ATTORNEYS

United States Patent Office 2,861,657
Patented Nov. 25, 1958

2,861,657

AUTOMATIC SLACK ADJUSTER FOR BRAKE

Everett C. Curtis, John T. Crawford and Dafydd W. Evans, Cleveland, Ohio, assignors to Towmotor Corporation, Cleveland, Ohio, a corporation of Ohio Application September 23, 1953, Serial No. 381,842

2 Claims. (Cl. 188—196)

This invention relates broadly to brakes for automotive vehicles and more specifically to mechanism for the automatic adjustment of the shoes for compensating for the wear of the brake lining.

Broadly the invention contemplates a pawl or keeper bar carried by one of the brake shoes and a pivotally supported ratchet arm carried by the opposed shoe in a brake assembly of the type in which the shoes are pressed into engagement with the flange of the drum and retracted therefrom by a contractile spring or hydraulic plunger. The ratchet delimits the retraction of the shoes, the teeth therein being formed to provide a minimum clearance between the drum and brake lining and a wear tolerance constituting a maximum clearance. Thus, during the application of the brake the keeper will ride upon the root of the ratchet tooth, with which it is engaged, and remain in contact therewith until the wear of the brake lining exceeds the wear tolerance in the tooth at which time the ratchet bar will drop and effect the engagement of the successive tooth with the keeper.

Further objects and advantages of the invention reside in the provision of an automatic brake adjusting mechanism which is economic to manufacture, efficient in operation, sturdy of structure, and susceptible to readjustment when the brake lining is renewed.

Other objects and advantages more or less ancillary to the foregoing, and the manner in which all the various objects are realized, will appear in the following description, which considered in connection with the accompanying drawings, sets forth the preferred embodiment of the invention.

In the drawings:

Fig. 1 is a front elevational view of a brake drum and shoe assembly illustrating the brake adjusting mechanism in place thereon.

Fig. 2 is a horizontal sectional view through the brake shoe assembly, the section being taken on a plane indicated by the line 2—2 in Fig. 1;

Fig. 3 is a side elevational view of a fragmentary portion of the ratchet mechanism, the detail being shown upon an enlarged scale in the interest of clarity; and Fig. 4 is a side elevational view of a fragmentary portion of the ratchet arm.

Referring first to Fig. 1 the brake drum 10 is mounted in the usual manner on a companion flange 11 splined to the drive shaft 12. The brake shoes 13 and 14, which are of a conventional form, are fulcrummed for oscillatory movement on pintles 15 mounted in a stationary member of the vehicle chassis. The shoes may be adjusted for concentric alignment with the drum through a cam 16 adjacent the pintles 15 and are actuated by a piston cylinder assembly 17 disposed between the shoes in diametric opposition to the cam 16. The inner web portion 18 of the brake shoes are drilled adjacent the lower ends thereof for the reception of pins 19 supporting yokes 20 and 20a constituting the carriers for the ratchet arm 21 and keeper bar 22. The yoke 20a for the keeper bar is provided with a cross member 23 forming the seat for a helical spring 24 arranged to urge the keeper outwardly towards the ratchet arm 21. The end wall of the yoke and the cross member 23 are centrally drilled for the reception of the stem 25 of the keeper, a stop 26 being affixed thereon for engagement with the opposed end of the spring. The second yoke 20 is provided with a reinforcing frame 27 embodying an end wall 28 which is broached for the reception of the rectangular end portion of the keeper bar 22. The yoke and frame 27 are cross-drilled intermediate their ends for a pin 29 constituting the fulcrum for the ratchet arm 21. The arm is urged downwardly into engagement with the face of the keeper by a spring coiled about the pin 29 with the end portions thereof bearing upon the upper faces of the yoke and arm.

As will be seen in Fig. 3, the lower face or root 32 of the teeth is generated from the center of the fulcrum of the arm and are of uniform length and equal height. The shoulders 33 of the ratchet arm are inclined forwardly or raked in parallel relation with the end wall of the keeper and a relief 34 may be provided in the inner ends thereof to accommodate grinding. The rake of the teeth is formed to provide a minimum brake lining clearance as designated by the dimension "C" (Fig. 4), the length of the root 32 of the teeth being proportioned to provide the maximum brake lining clearance.

In operation, when the brake is applied the shoes are forced apart until the lining is frictionally engaged with the drum. Thereafter, as the brake is released, the shoes are retracted until movement thereof is arrested by engagement of the keeper with the confronting tooth in the ratchet arm. During this operation the keeper will ride upon the root of the tooth then engaged and remain in contact therewith until the wear of the brake lining affords sufficient movement of the shoes to permit the shoulder 33 of the engaged tooth to escape the end of the keeper and effect the engagement thereof with the succeeding tooth in the ratchet arm. When such adjustment occurs the shoes will be held to the minimum clearance "C" until the brake lining wear again equals the wear tolerance C of the latter tooth.

When the brake lining is renewed the ratchet arm is positioned so that the keeper engages with the innermost tooth and the adjustment of the shoes will follower the cycle of operation outlined above.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What is claimed is:

1. A wear compensating device for a brake of the type having a pair of semi-circular brake shoes adapted to be moved away from each other into frictional engagement with a brake drum comprising a first yoke adapted for pivotal mounting on one brake shoe, said yoke having side walls spaced from each other, a notched pawl pivotally mounted between the side walls and spring means to bias the pawl in one direction about its pivotal mounting, a second yoke adapted for pivotal mounting on the other brake shoe, said second yoke having spaced side walls and a pair of spaced apertured members connecting the side walls, an elongated keeper having a stem portion extending through the apertures in said second yoke and a head portion disposed between the side walls of the first yoke in alignment with the notches in the pawl and spring means carried by said second yoke engaging the keeper to bias the keeper toward said pawl.

2. A wear compensating device for a brake of the type having a pair of pivoted shoes arranged to be moved away from each other to frictionally engage a brake drum comprising a pawl yoke adapted for pivotal mounting on one brake shoe, said yoke having spaced parallel side walls and a pair of spaced apertured members connecting the side walls, a spring-pressed pawl mounted within the pawl yoke between the mounting of the yoke and said spaced connecting members, said pawl having notches in alignment with the apertures in said connecting members, a keeper yoke adapted for pivotal mounting on the other brake shoe, said keeper yoke having spaced side walls and a pair of spaced apertured members connecting the side walls, and an elongated keeper disposed in the aligned apertures of the pawl yoke and the keeper yoke, spring means carried by the keeper yoke operatively engaging the keeper to bias said keeper toward said pawl.

References Cited in the file of this patent

UNITED STATES PATENTS

| | | |
|---|---|---|
| 2,228,576 | Marino | Jan. 14, 1941 |
| 2,322,492 | Williams | June 22, 1943 |
| 2,414,037 | Geyer | Jan. 7, 1947 |
| 2,472,697 | Du Bois | June 7, 1949 |
| 2,533,927 | Geyer | Dec. 12, 1950 |
| 2,649,168 | Shipes | Aug. 18, 1953 |
| 2,730,205 | Bauman | Jan. 10, 1956 |
| 2,740,499 | Dear | Apr. 3, 1956 |
| 2,775,321 | Phillips | Dec. 25, 1956 |

FOREIGN PATENTS

| | | |
|---|---|---|
| 125,191 | Great Britain | Apr. 14, 1919 |